United States Patent
Raj (10) Patent No.: US 10,212,095 B2
(45) Date of Patent: Feb. 19, 2019

(54) MAXIMUM TRANSMISSION UNIT INSTALLATION FOR SWITCHES IN A SOFTWARE-DEFINED NETWORK

(71) Applicant: HEWLETT-PACKARD DEVELOPMENT COMPANY, L.P., Houston, TX (US)

(72) Inventor: Anil Raj, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 168 days.

(21) Appl. No.: 15/198,045

(22) Filed: Jun. 30, 2016

(65) Prior Publication Data

US 2017/0005943 A1 Jan. 5, 2017

(30) Foreign Application Priority Data

Jun. 30, 2015 (IN) ............................ 3343/CHE/2015

(51) Int. Cl.
| | |
|---|---|
| *H04L 12/805* | (2013.01) |
| *H04L 29/06* | (2006.01) |
| *H04L 12/707* | (2013.01) |
| *H04L 29/08* | (2006.01) |
| *H04L 12/721* | (2013.01) |
| *H04L 12/771* | (2013.01) |
| *H04L 12/717* | (2013.01) |
| *H04L 12/24* | (2006.01) |

(52) U.S. Cl.
CPC .......... *H04L 47/36* (2013.01); *H04L 41/0896* (2013.01); *H04L 45/22* (2013.01); *H04L 45/38* (2013.01); *H04L 45/42* (2013.01); *H04L 45/56* (2013.01); *H04L 67/10* (2013.01); *H04L 69/167* (2013.01)

(58) Field of Classification Search
CPC ..... H04L 41/0896; H04L 45/22; H04L 45/38; H04L 45/42; H04L 45/56; H04L 47/36; H04L 67/10; H04L 69/167
See application file for complete search history.

(56) References Cited

U.S. PATENT DOCUMENTS

| | | | |
|---|---|---|---|
| 7,684,440 B1 | 3/2010 | Maufer et al. | |
| 2003/0076850 A1* | 4/2003 | Jason, Jr. | ................ H04L 43/50 370/414 |
| 2005/0220022 A1* | 10/2005 | DelRegno | ............... H04L 47/10 370/235 |

(Continued)

FOREIGN PATENT DOCUMENTS

WO WO-2014/050091 A1 4/2014

OTHER PUBLICATIONS

"MSS Clamping as a Tale of Network Visibility," Jan. 15, 2015, pp. 1-3.

*Primary Examiner* — Gil H. Lee
(74) *Attorney, Agent, or Firm* — Brooks, Cameron & Huebsch, PLLC (57) ABSTRACT

In some examples, a method includes determining, with a Software-Defined Network (SDN) controller of an SDN, a Maximum Transmission Unit (MTU) value for switches along a routing path for a data flow based on packet overhead for the data flow and transmitting MTU installation instructions to the switches along the routing path to install the determined MTU value on the switches of the routing path.

13 Claims, 8 Drawing Sheets

(56) References Cited

U.S. PATENT DOCUMENTS

| | | | |
|---|---|---|---|
| 2009/0185572 A1* | 7/2009 | Yasuma | H04L 12/4625 |
| | | | 370/401 |
| 2009/0316574 A1 | 12/2009 | Winter et al. | |
| 2012/0203878 A1 | 8/2012 | Hua et al. | |
| 2014/0269277 A1* | 9/2014 | DeCusatis | H04L 47/365 |
| | | | 370/230 |
| 2014/0376427 A1 | 12/2014 | Hui et al. | |
| 2015/0055480 A1 | 2/2015 | DeCusatis et al. | |
| 2015/0113132 A1* | 4/2015 | Srinivas | H04L 41/0816 |
| | | | 709/224 |
| 2015/0365357 A1* | 12/2015 | Sreeramoju | H04L 49/70 |
| | | | 370/218 |
| 2016/0164794 A1* | 6/2016 | Ramalingam | H04L 47/365 |
| | | | 370/235 |
| 2016/0204856 A1* | 7/2016 | Yin | H04B 10/038 |
| | | | 398/5 |

* cited by examiner

MAXIMUM TRANSMISSION UNIT INSTALLATION FOR SWITCHES IN A SOFTWARE-DEFINED NETWORK

BACKGROUND

Computer networks can be used to allow networked devices, such as personal computers, servers, and data storage devices to exchange data. Computer networks often include intermediary datapath devices such as network switches, gateways, and routers, to flow traffic along selected datapaths for routing data between networked devices. Such datapaths can, for example, be selected by a network controller, administrator, or another entity, and can, for example, be based on network conditions, network equipment capabilities, or other factors.

DETAILED DESCRIPTION

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

Software-defined networks/networking (SDN) can allow for the decoupling of traffic routing control decisions from the network's physical infrastructure. For example, in an SDN, such traffic routing control decisions (e.g., which port of a network switch should be used to forward traffic en route to a given destination) can be determined by an entity (e.g., a network controller) that is different from the routing device itself (e.g., the network switch tasked with forwarding the traffic). A network controller used to implement an SDN (i.e., an SDN controller) can, for example, be programmed to: (1) receive dynamic parameters of the network from intermediary datapath devices (e.g., network switches), (2) decide how to route packets over the network, and (3) inform the devices about these decisions.

A network node along a network datapath can be programmed with instructions for handling packets that are larger than a maximum transmission unit (MTU) size for an outgoing link. For example, packets can be flagged by their source to indicate whether packet fragmentation is permitted or not permitted. When fragmentation is permitted and the packet is larger than an MTU size for an outgoing link, the node can be instructed to break the packet into smaller packets, so that each packet can pass through the link. When fragmentation is not permitted and the packet is larger than the MTU size for the outgoing link, the node can be instructed to drop the packet and send an error message to the source of the packet.

Business customers of internet service providers (ISP) often have specific criteria for Virtual Local Area Network (VLAN) identifications (IDs) as well as the number of VLANs to be supported. With stacked VLANs and 802.1Q tunneling (Q-in-Q tunneling), service providers can use a unique VLAN (SP-VLAN ID) to support customers who have multiple VLANs. This feature can require all the switches involved in the Q-in-Q tunneling, Multi-Protocol Label Switch (MPLS) Virtual Private Networks (VPNs), data tunneling, Universal Transport Interface (UTI)/Layer 2 Tunnel Protocol Version 3 (L2TPV3) pass-through etc., to support larger MTU sizes, such as those for Ethernet frames up to 1600 bytes in size (i.e., "baby giant frames"). Since routes to destinations within a network can be dynamic, it can be challenging to identify enable baby giant frames on all the switches in the network that are involved in forwarding a given packet.

Certain implementations of the present disclosure can be used to dynamically support varying MTU requirements, which can, for example, allow support for baby giant frames on identified devices on an SDN controlled service provider network. Certain implementations of the present disclosure can afford several advantages, such as: (1) being relatively easy to implement, (2) avoiding fragmentation caused by encapsulation overhead while tunneling the packets, (3) providing traffic segregation for traffic from different customers, (4) providing support for proactive backup path MTU programming, (5) providing better manageability and flexibility, (6) providing support for various overhead sizes resulting from various encapsulation methods, and (7) updating MTU configurations only on actual nodes that are involved in forwarding traffic only. Additional and alternative advantages of certain implementations presented herein will be apparent upon review of the description and figures.

Figure 1:
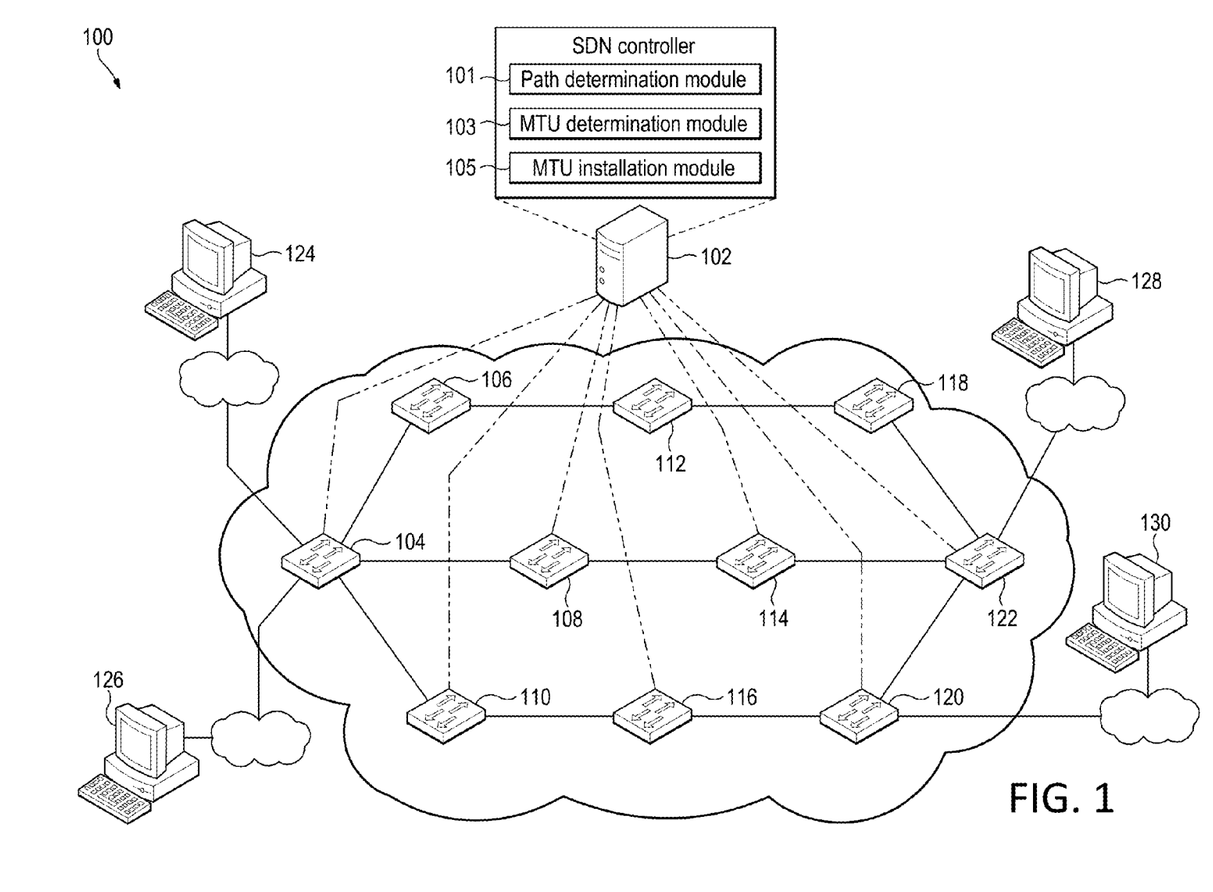
FIG. 1 is a diagram of a network, according to an example.
Figure 7:
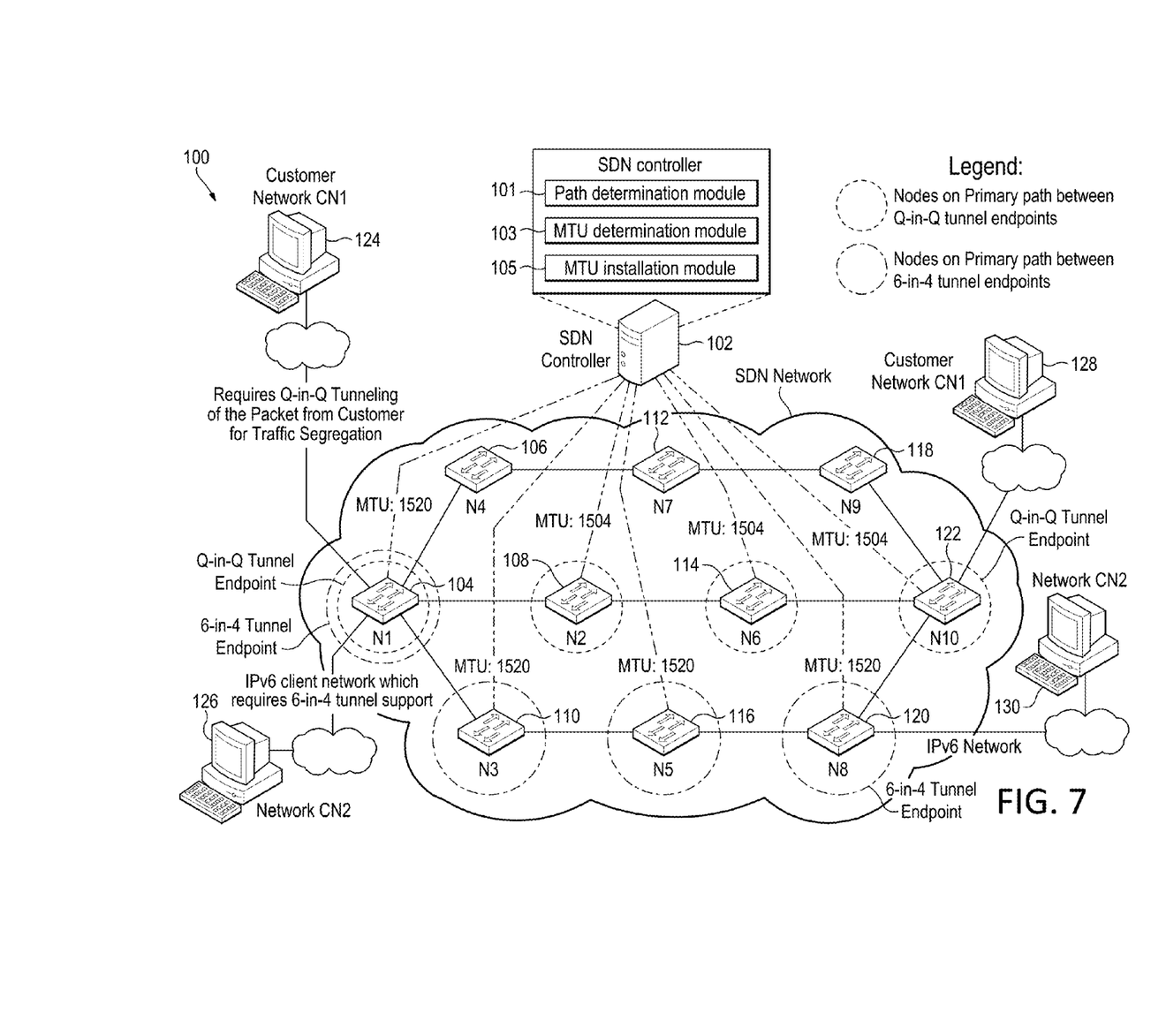
FIG. 7 is a diagram of a network use case, according to an example.
Figure 8:
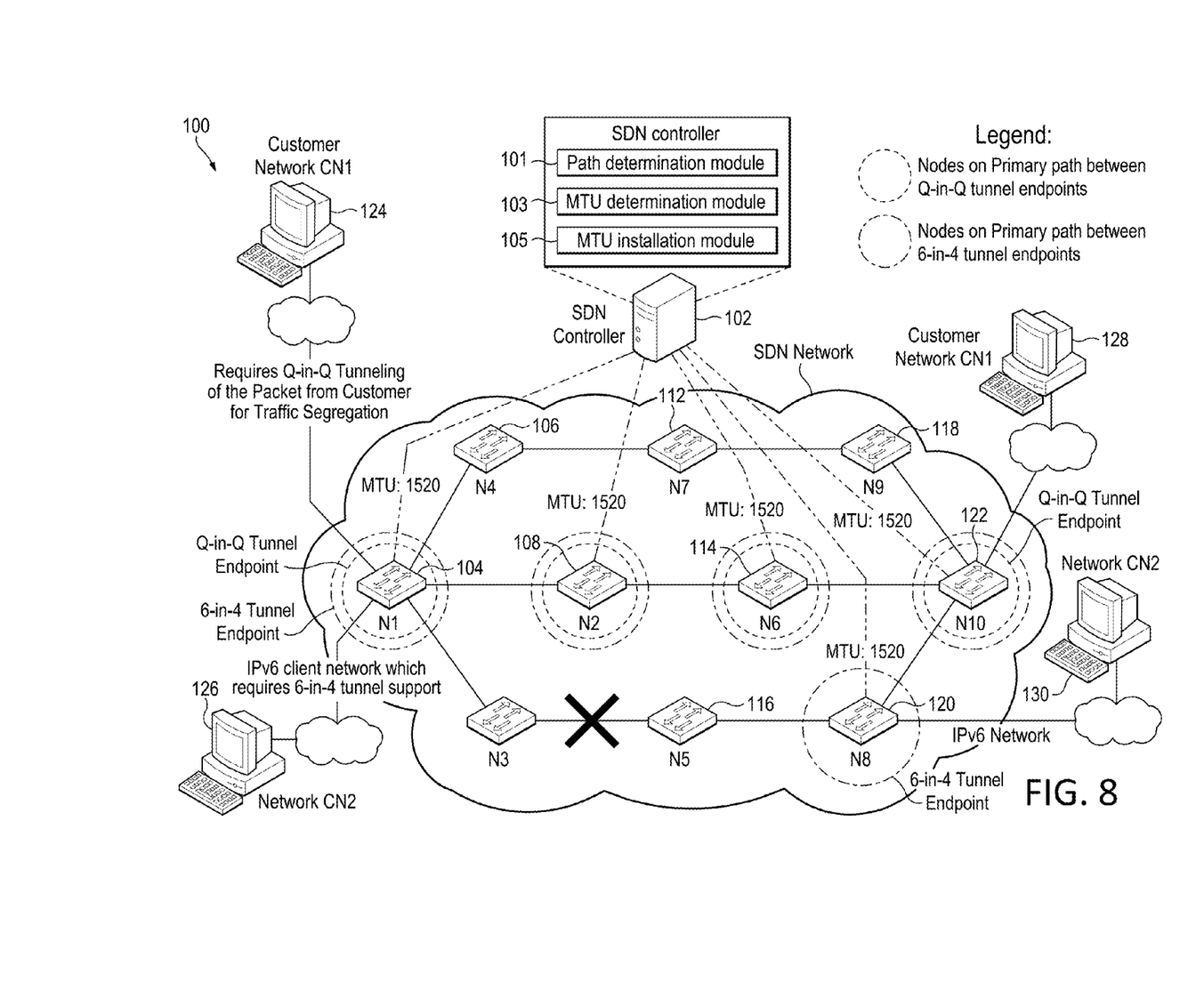
FIG. 8 is a diagram of a network use case, according to an example.

FIG. 1 is a diagram of an example Software-Defined Network (SDN) 100 including an example SDN controller 102 including various combined hardware and software modules 101, 103, and 105 (the structure and functionality of the modules of SDN controller 102 are described in detail below with respect to FIG. 5) as well as various switches 104, 106, 108, 110, 112, 114, 116, 118, 120, and 122. FIGS. 7 and 8 illustrate a use case involving SDN 100 and are described in further detail below. In some implementations, SDN 100 includes various hardware switches or other routing devices that are connected using physical cabling or other physical data channels. In some implementations, SDN 100 is a virtualized network. Such a virtualized network can, for example, overlay physical hardware of a network including multiple computing devices or just a single computing device.

FIG. 1 further illustrates various host devices 124, 126, 128, and 130 that serve as source and destination nodes. For purposes of consistency, devices 124 and 126 will be referred to herein as source nodes, and devices 128 and 130 will be referred to as destination nodes. It is appreciated that in some implementations, devices 124 and/or 126 can serve as destination nodes and devices 128 and/or 130 can serve as source nodes. It is further appreciated that certain nodes may serve as a source node for a period of time (e.g., while sending data) and then switch into a receiving node for a period of time (e.g., while receiving data). That is, the use of the terms "source" and "destination" are merely intended to refer to a flow of traffic at a given time.

As provided above, network nodes within SDN 100 can forward traffic along the datapath based on metadata within the traffic. For example, traffic in the form of a packet can be received at network switch 104 (or another suitable intermediary network node). For consistency, the industry term "packet" is used throughout this description, however, it is appreciated that the term "packet" as used herein can refer to any suitable protocol data unit (PDU). Such a packet can, for example, include payload data as well as metadata (e.g., header data and tag data) in the form of control data. Control data can, for example, provide data to assist the network node with reliably delivering the payload data. For example, control data can include network addresses for source node 124 and destination node 128, error detection codes, sequencing information, packet size of the packet, a time-to-live (TTL) value, etc. In contrast, payload data can include data carried on behalf of an application for use by nodes (e.g., source node 124 and destination node 128).

As provided above, in an SDN (such as for example SDN 100), control decisions for routing traffic through the network can be decoupled from the network's physical infrastructure. In some implementations, the switches of FIG. 1 are within the control domain of SDN controller 102. As used herein, the term "controlled" and similar terminology in the context of SDN-compatible network nodes, such as "controlled switches," is intended to include devices within the control domain of SDN controller 102 or otherwise similarly controllable by SDN controller 102. Such a controlled node can, for example, communicate with SDN controller 102 and SDN controller 102 is able to manage the node in accordance with an SDN protocol, such as the OpenFlow protocol. For example, an OpenFlow-compatible switch controlled by SDN controller 102 can permit SDN controller 102 to add, update, and delete flow entries in flow tables of the switch using suitable SDN commands.

In some implementations, the nodes of SDN 100 can, for example, be in the form of network switches or other intermediary network devices. The use of such software-defined networking can provide other functionality. For example, one or more applications can be installed on or interface with SDN controller 102 to meet customer use cases, such as to achieve a desired throughput (or another QoS) over SDN 100, enforce security provisions for SDN 100, or provide another suitable service or functionality.

The functionality of SDN controller 102 can, for example, be implemented in part via a software program on a standalone machine, such as a standalone server. In some implementations, SDN controller 102 can be implemented on multi-purpose machines, such as a suitable desktop computer, laptop, tablet, or the like. In some implementations, SDN controller 102 can be implemented on a suitable non-host network node, such as certain types of network switches. It is appreciated that the functionality of SDN controller 102 may be split among multiple controllers or other devices. For example, SDN 100 is described and illustrated as including only one SDN controller 102. However, it is appreciated that the disclosure herein can be implemented in SDNs with multiple controllers. For example, in some SDNs, network devices are in communication with multiple controllers such that control of the network can be smoothly handed over from a first controller to a second controller if a first controller fails or is otherwise out of operation. As another example, multiple controllers can work together to concurrently control certain SDNs. In such SDNs, a first controller can, for example, control certain network devices while a second controller can control other network devices. In view of the above, reference in this application to a single SDN controller 102 that controls the operation of SDN 100 is intended to include such multiple controller configurations (and other suitable multiple controller configurations).

Source nodes 124 and 126 and destination nodes 128 and 130 can, for example, be in the form of network hosts or other types of network nodes. For example, one or all of source nodes 124 and 126 and destination nodes 128 and 130 can be in the form of suitable servers, desktop computers, laptops, printers, etc. As but one example, source nodes 124 and 126 can be in the form of a desktop computer including a monitor for presenting information to an operator and a keyboard and mouse for receiving input from an operator, and destination nodes 128 and 130 can be in the form of respective standalone storage server appliances. It is further appreciated that source nodes 124 and 126 and destination nodes 128 and 130 can be endpoint nodes on SDN 100, intermediate nodes between endpoint nodes, or positioned at other logical or physical locations within SDN 100.

The various intermediary nodes within SDN 100 can, for example, be in the form of switches or other multi-port network bridges that process and forward data at the data link layer. In some implementations, one or more of the nodes can be in the form of multilayer switches that operate at multiple layers of the Open Systems Connection (OSI) model (e.g., the data link and network layers). Although the term "switch" is used throughout this description, it is appreciated that this term can refer broadly to other suitable network data forwarding devices. For example, the term "switch" can include other network datapath elements in the form of suitable routers, gateways and other devices that provide switch-like functionality for SDN 100. As another example, a general purpose computer can include suitable hardware and machine-readable instructions that allow the computer to function as a network switch.

In some implementations, the SDN-capable switches within SDN 100 can rely on flow rules stored on the switch (or otherwise accessible by the switch) for forwarding or otherwise handling traffic. Flow rules can, for example, contain information such as: (1) match fields to match against packets (e.g., an ingress port and specific packet header fields), (2) a priority value for the flow rule to allow prioritization over other flow entries, (3) counters that are updated when packets are matched, (4) instructions to modify the action set or pipeline processing, (5) timeouts indicating a maximum amount of time or idle time before a flow is expired by the switch, and (6) a cookie value which can be used by the SDN controller to filter flow statistics, flow modification, and flow deletion.

The various nodes within SDN 100 are connected via one or more data channels, which can, for example be in the form of data cables or wireless data channels. Although a single link (i.e., a single line in FIG. 1) between each network node is illustrated, it is appreciated that each single link may include multiple wires or other wired or wireless data channels. Moreover, FIG. 1 further depicts SDN controller 102 as being connected to each network nodes via broken lines, which is intended to illustrate control channels between SDN controller 102 and respective nodes. However, it is appreciated that SDN controller 102 may be directly connected to only one or a few network nodes, while being indirectly connected to other nodes of SDN 100. As but one example, SDN controller 102 can be directly connected to node 114 via an Ethernet cable, while being indirectly connected to node 116 (e.g., by relying on node 114 as an intermediary for communication with node 116).

Within the context of an SDN, controlled network nodes can be used as sensors in the network as they have information about dynamic network parameters. When polled via standard SDN interfaces the devices can report this information to SDN controller 102. SDN 100 can, for example, be implemented through the use of SDN controller 102 that interfaces with various SDN-compatible devices via a suitable Application Program Interface ("API"), or another suitable protocol (e.g., OpenFlow). In some implementations, SDN controller 102 may interface with controlled network devices via an interface channel that connects each controlled device to SDN controller 102 to allow SDN controller 102 to configure and manage each device, receive events from each device, and send packets using each device.

In the example SDN 100 depicted in FIG. 1, the various network nodes are in the form of intermediary nodes (e.g., controlled network switch 108) and host devices (e.g., source nodes 124 and 126 and destination nodes 128 and 130). It is appreciated however, that the implementations described herein can be used or adapted for networks including more or fewer devices, different types of devices, and different network arrangements.

Figure 2:
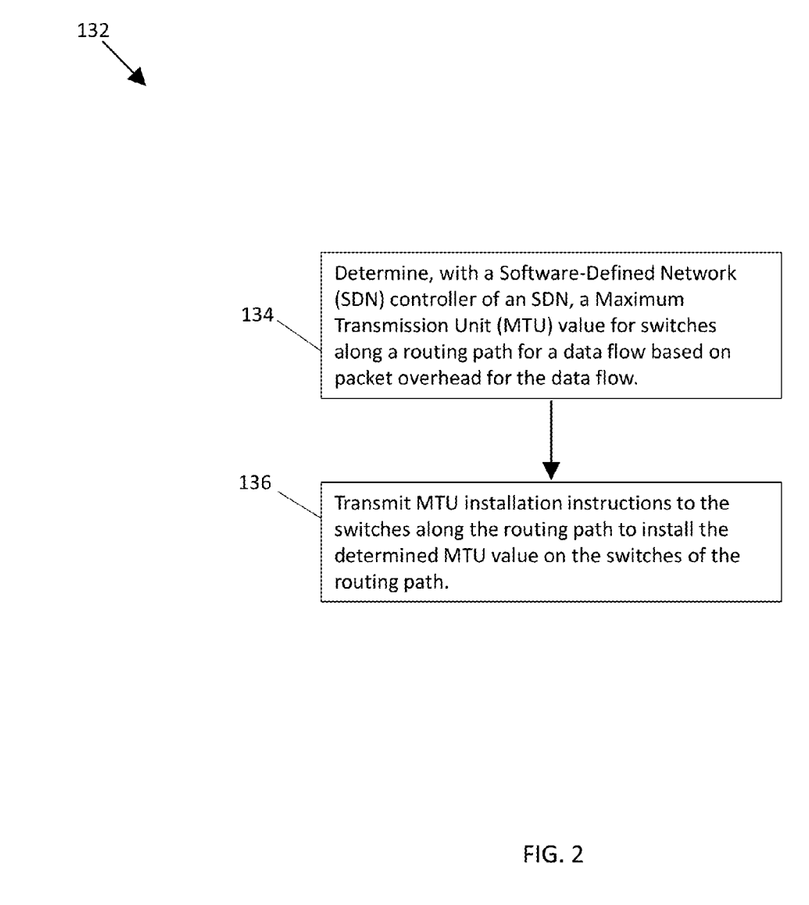
FIG. 2 is a flowchart for a method, according to an example.

FIG. 2 illustrates a flowchart for a method 132 according to an example of the present disclosure. For illustration, the description of method 132 and its component steps make reference to example SDN 100 and elements thereof, such as for example SDN controller 102, however, it is appreciated that method 132 or aspects thereof can be used or otherwise applicable for any suitable network or network element described herein or otherwise. For example, method 132 can be applied to computer networks with different network topologies than those illustrated in FIG. 1.

In some implementations, method 132 can be implemented in the form of executable instructions stored on a memory resource (e.g., the memory resource of FIG. 5), executable machine readable instructions stored on a storage medium (e.g., the medium of FIG. 6), in the form of electronic circuitry (e.g., on an Application-Specific Integrated Circuit (ASIC)), and/or another suitable form. Although the description of method 132 herein primarily refers to steps performed on SDN controller 102 for purposes of illustration, it is appreciated that in some implementations, method 132 can be executed on another computing device within SDN 100 or in data communication with SDN controller 102.

Method 132 includes determining (at block 134), with SDN controller 102, an MTU value for switches along a routing path for a data flow based on packet overhead for the data flow. It is appreciated that certain SDN controllers, such as SDN controller 102, can, for example, use SDN protocols such as OpenFlow to communicate with SDN switches. A standard Ethernet payload for use with the OpenFlow protocol can, for example, include a Maximum Transmission Unit (MTU) value of 1500 bytes. The frame size does not account for packet overhead, which can, for example be in the form of protocol overhead, encapsulation overhead, and/or tag overhead. In some implementations, the packet overhead includes the Ethernet header or Cyclic Redundancy Check (CRC) trailer of the packet, which can add 18 bytes in length, and which can expand the total Ethernet frame size to 1518 bytes. In some implementations, the packet overhead for the data flow includes 4 bytes for Q-in-Q tunneling and 20 bytes for 6-in-4 tunneling to support IPv6 traffic over an IPv4 network.

In some implementations, the MTU value can be determined based on the configuration of tunneling protocols (like Q-in-Q, 6-in-4, VxLAN, etc.) on two end-points of the network (e.g., source node 124 and destination node 128). It is appreciated that an additional amount of bytes of protocol overhead will vary based on the encapsulation type. For example, the following table identifies encapsulation overhead added to a frame for various protocols:

| Protocol | Encapsulation overhead |
| --- | --- |
| GRE (IP Protocol 47) (RFC 2784) | 24 bytes (20 byte IPv4 header and 4 byte GRE header) |
| 6in4 encapsulation (IP Protocol 41, RFC 4213) | 20 bytes |
| 4in6 encapsulation (e.g. DS-Lite RFC 6333) | 40 bytes |
| IPsec encryption | 73 bytes for ESP-AES-256 and ESP-SHA-HMAC overhead (overhead depends on transport or tunnel mode and the encryption/ authentication algorithm and HMAC) |
| MPLS | 4 bytes for each label in the stack |
| IEEE 802.1Q tag | 4 bytes (Q-in-Q) |
| VXLAN | 50 bytes |
| OTV (Overlay Transport Virtualization) | 42 bytes |
| LISP (Locator/ID Separation Protocol) | 36 bytes for IPv4 and 56 bytes for IPv6 encapsulation |
| NVGRE | 42 bytes |
| STT (Stateless Transport Tunneling Protocol) | 54 bytes |
| UTI/L2TPV3 pass-through | 50 bytes |

In some implementations, block 134 includes determining an MTU to avoid fragmentation of packets in the data flow. For example, in some implementations the MTU is determined to support Ethernet frames having a size up to 1600 bytes (i.e., to support "baby giant" frames) and in some implementations, the MTU is determined to support Ethernet frames having a size up to 9216 bytes (i.e., to support "jumbo" frames).

Method 132 includes transmitting (at block 136) MTU installation instructions to the switches along the routing path to install the determined MTU value on the switches of the routing path. Although the flowchart of FIG. 2 shows a specific order of performance, it is appreciated that this order may be rearranged into another suitable order, may be executed concurrently or with partial concurrence, or a combination thereof. Likewise, suitable additional and/or comparable steps may be added to method 132 or other methods described herein in order to achieve the same or comparable functionality. In some implementations, one or more steps are omitted. For example, in some implementations, block 136 of determining an MTU value can be omitted from method 132 and/or replaced with another function. It is appreciated that blocks corresponding to additional or alternative functionality of other implementations described herein can be incorporated in method 132. For example, blocks corresponding to the functionality of various aspects of SDN controller 102 otherwise described herein can be incorporated in method 132 even if such functionality is not explicitly characterized herein as a block in method 132.

Figure 3:
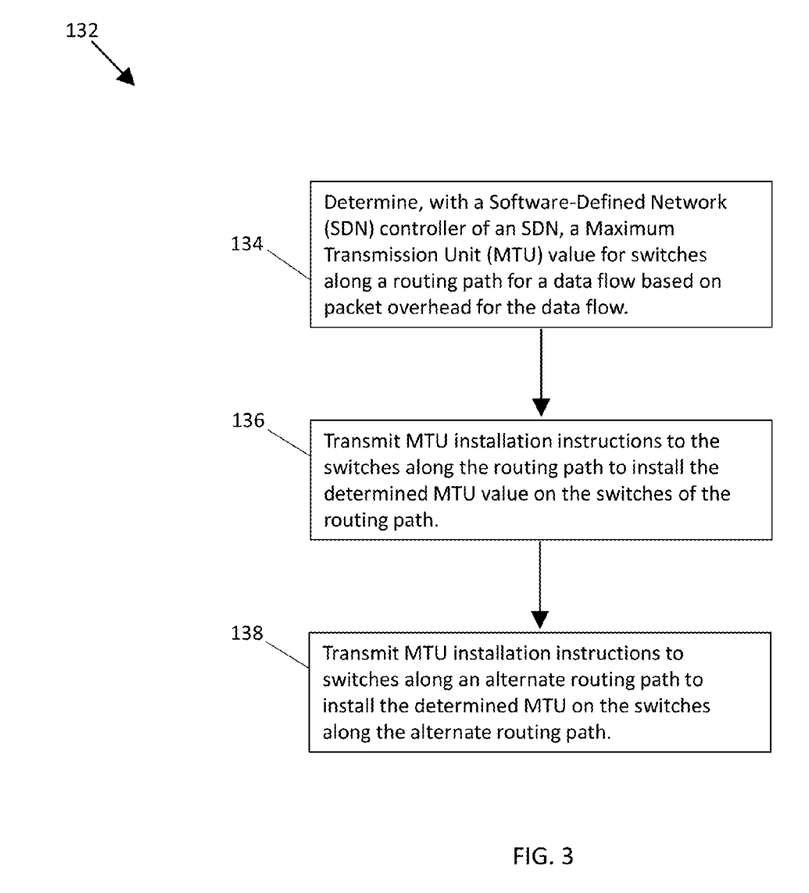
FIG. 3 is a flowchart for a method, according to another example.

FIG. 3 illustrates another example of method 132 in accordance with the present disclosure. For illustration, FIG. 3 reproduces various blocks from method 132 of FIG. 2, however it is appreciated that method 132 of FIG. 3 can include additional, alternative, or fewer steps, functionality, etc., than method 132 of FIG. 2 and is not intended to be limited by the diagram of FIG. 2 (or vice versa) or the related disclosure thereof. It is further appreciated that method 132 of FIG. 2 can incorporate one or more aspects of method 132 of FIG. 3 and vice versa. For example, in some implementations, method 132 of FIG. 2 can include the additional step described below with respect to method 132 of FIG. 3. Method 132 includes transmitting (at block 138) MTU installation instructions to switches along an alternate routing path to install the determined MTU on the switches along the alternate routing path. As described below with respect to FIG. 8, the alternate routing path can, for example, be used as a failover path in case of link failure along an original routing path.

Figure 4:
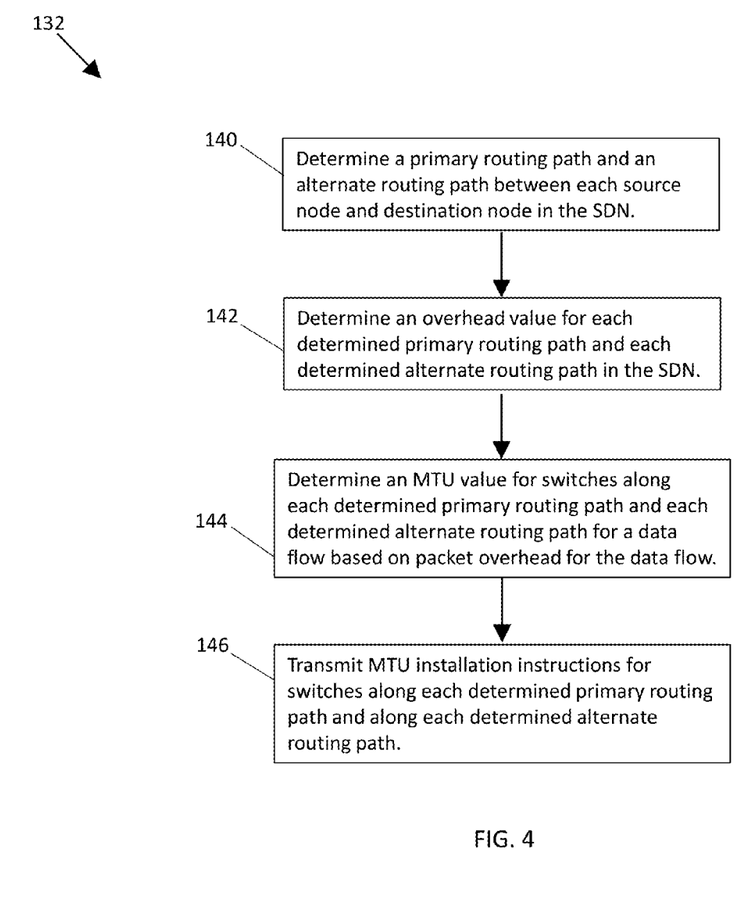
FIG. 4 is a flowchart for a method, according to another example.

FIG. 4 illustrates another example of method 132 in accordance with the present disclosure. For illustration, FIG. 4 reproduces various blocks from method 132 of FIG. 2, however it is appreciated that method 132 of FIG. 4 can include additional, alternative, or fewer steps, functionality, etc., than method 132 of FIG. 2 and is not intended to be limited by the diagram of FIG. 2 (or vice versa) or the related disclosure thereof. It is further appreciated that method 132 of FIG. 2 can incorporate one or more aspects of method 132 of FIG. 4 and vice versa. For example, in some implementations, method 132 of FIG. 2 can include the additional step described below with respect to method 132 of FIG. 4.

Method 132 includes determining (at block 140) a primary routing path and an alternate routing path between each source node and destination node in the SDN. For example, SDN controller 102 can be used to instruct network nodes to flow traffic along a selected routing path defined by the nodes. It is appreciated that the routing path can be determined by SDN controller 102 based on one or more static parameters, such as link speeds and number hops between the nodes and can further (or alternatively) be based on one or more dynamic parameters, such as Quality of Service (QoS), network latency, network throughput, network power consumption, etc. In some implementations, block 140 can include determining a primary routing path between each source node and destination node in the SDN and determining an alternate routing path between each source node and destination node in the SDN.

Method 132 includes determining (at block 142) an overhead value for each determined primary routing path and each determined alternate routing path in the SDN. In some implementations, block 142 can include determining an overhead value for each determined primary routing path in the SDN and determining an overhead value for each determined alternate routing path in the SDN.

Method 132 includes determining (at block 144) an MTU value for switches along each determined primary routing path and each determined alternate routing path for a data flow based on packet overhead for the data flow. Method 132 further includes transmitting (at block 146) MTU installation instructions for switches along each determined primary routing path and along each determined alternate routing path. In some implementations, block 146 includes transmitting an MTU installation instruction for switches along each determined primary routing path in the SDN. In some implementations, block 146 includes transmitting MTU installation instruction for switches along each determined alternate routing path to install the determined MTU value on the switches of the routing path.

Figure 5:
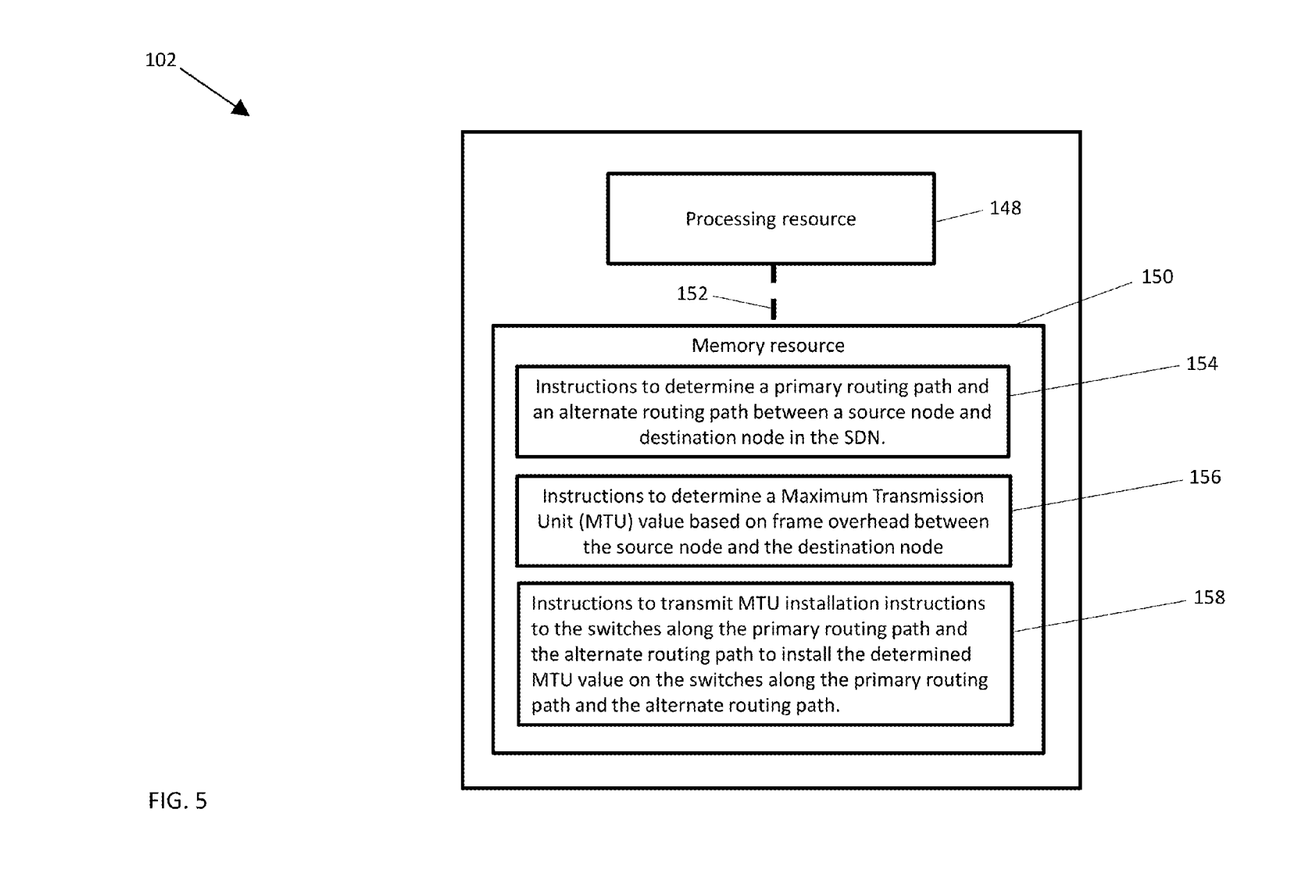
FIG. 5 is a diagram of an SDN controller, according to an example.

FIG. 5 is a diagram of one implementation of SDN controller 102. As described in further detail below, SDN controller 102 includes a processing resource 148 and a memory resource 150 that stores machine-readable instructions 154, 156, and 158. For illustration, the description of SDN controller 102 of FIG. 5 makes reference to various aspects of method 132 of FIGS. 2-4. Indeed, for consistency, the same reference number for the SDN controller of FIG. 1 is used for the SDN controller of FIG. 5. However it is appreciated that the SDN controller of FIG. 5 can include additional, alternative, or fewer aspects, functionality, etc., than the implementation described with respect to method 132 as well as the SDN controller of FIG. 1 and is not intended to be limited by the related disclosure thereof.

Instructions 154 stored on memory resource 150 are, when executed by processing resource 148, to cause processing resource 148 to determine a primary routing path and an alternate routing path between a source node and destination node in the SDN. Instructions 154 can incorporate one or more aspects of blocks of method 132 or another suitable aspect of other implementations described herein (and vice versa).

Instructions 156 stored on memory resource 150 are, when executed by processing resource 148, to cause processing resource 148 to determine a Maximum Transmission Unit (MTU) value based on frame overhead between the source node and the destination node. Instructions 156 can incorporate one or more aspects of blocks of method 132 or another suitable aspect of other implementations described herein (and vice versa).

Instructions 158 stored on memory resource 150 are, when executed by processing resource 148, to cause processing resource 148 to transmit MTU installation instructions to the switches along the primary routing path and the alternate routing path to install the determined MTU value on the switches along the primary routing path and the alternate routing path. Instructions 158 can incorporate one or more aspects of blocks of method 132 or another suitable aspect of other implementations described herein (and vice versa).

Processing resource 148 of SDN controller 102 can, for example, be in the form of a central processing unit (CPU), a semiconductor-based microprocessor, a digital signal processor (DSP) such as a digital image processing unit, other hardware devices or processing elements suitable to retrieve and execute instructions stored in memory resource 150, or suitable combinations thereof. Processing resource 148 can, for example, include single or multiple cores on a chip, multiple cores across multiple chips, multiple cores across multiple devices, or suitable combinations thereof. Processing resource 148 can be functional to fetch, decode, and execute instructions as described herein. As an alternative or in addition to retrieving and executing instructions, processing resource 148 can, for example, include at least one integrated circuit (IC), other control logic, other electronic circuits, or suitable combination thereof that include a number of electronic components for performing the functionality of instructions stored on memory resource 150. The term "logic" can, in some implementations, be an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor.

Processing resource 148 can, for example, be implemented across multiple processing units and instructions may be implemented by different processing units in different areas of SDN controller 102.

Memory resource 150 of SDN controller 102 can, for example, be in the form of a non-transitory machine-readable storage medium, such as a suitable electronic, magnetic, optical, or other physical storage apparatus to contain or store information such as machine-readable instructions 154, 156, and 158. Such instructions can be operative to perform one or more functions described herein, such as those described herein with respect to method 132 or other methods described herein. Memory resource 150 can, for example, be housed within the same housing as processing resource 148 for SDN controller 102, such as within a computing tower case for SDN controller 102. In some implementations, memory resource 150 and processing resource 148 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, memory resource 150 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that both machine-readable instructions as well as related data can be stored on memory mediums and that multiple mediums can be treated as a single medium for purposes of description.

Processing resource 148 and memory resource 150 can, for example, be in communication via a communication link 152. Each communication link 152 can be local or remote to a machine (e.g., a computing device) associated with processing resource 148. Examples of a local communication link 152 can include an electronic bus internal to a machine (e.g., a computing device) where memory resource 150 is one of volatile, non-volatile, fixed, and/or removable storage medium in communication with processing resource 148 via the electronic bus.

In some implementations, one or more aspects of SDN controller 102 can be in the form of functional modules that can, for example, be operative to execute one or more processes of instructions 154, 156, or 158 or other functions described herein relating to other implementations of the disclosure. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or hardware and software hosted at hardware. It is further appreciated that the term "module" is additionally intended to refer to one or more modules or a combination of modules. Each module of SDN controller 102 can, for example, include one or more machine-readable storage mediums and one or more computer processors.

In view of the above, it is appreciated that the various instructions of SDN controller 102 described above can correspond to separate and/or combined functional modules.

For example, instructions 154 can correspond to a "path determination module" (see, e.g., module 101 of FIG. 1) to determine a primary routing path and an alternate routing path between a source node and destination node in the SDN; instructions 156 can correspond to an "MTU value determination module" (see, e.g., module 103 of FIG. 1) to determine an MTU value based on frame overhead between the source node and the destination node; and instructions 158 can correspond to an "MTU installation module" (see, e.g., module 105 of FIG. 1) to transmit MTU installation instructions to the switches along the primary routing path and the alternate routing path to install the determined MTU value on the switches along the primary routing path and the alternate routing path. It is further appreciated that a given module can be used for multiple functions. As but one example, in some implementations, a single module can be used to both determine a primary routing path and an alternate routing path between a source node and destination node in the SDN (e.g., corresponding to aspects of instructions 156) as well as to determine an MTU value based on frame overhead (e.g., corresponding to aspects of instructions 158).

One or more nodes within SDN 100 (e.g., SDN controller 102) can further include a suitable communication module to allow networked communication between SDN controller 102 and other elements of SDN 100. Such a communication module can, for example, include a network interface controller having an Ethernet port and/or a Fibre Channel port. In some implementations, such a communication module can include wired or wireless communication interface, and can, in some implementations, provide for virtual network ports. In some implementations, such a communication module includes hardware in the form of a hard drive, related firmware, and other software for allowing the hard drive to operatively communicate with other hardware of SDN controller 102 or other network equipment. The communication module can, for example, include machine-readable instructions for use with communication the communication module, such as firmware for implementing physical or virtual network ports.

Figure 6:
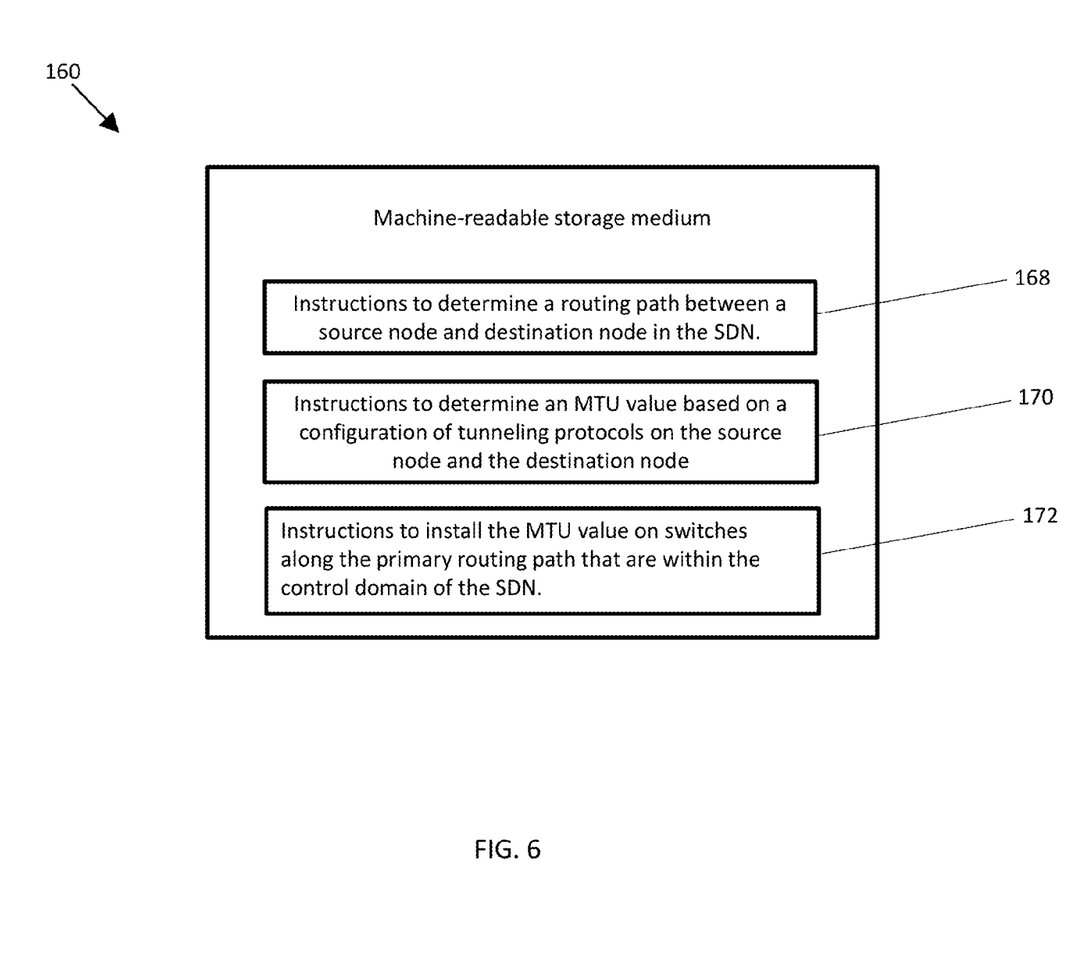
FIG. 6 is a diagram of machine-readable storage medium, according to an example.

FIG. 6 illustrates a machine-readable storage medium 166 including various instructions that can be executed by a computer processor or other processing resource. In some implementations, medium 166 can be housed within a physical SDN controller, such as certain implementations of SDN controller 102, or on another computing device within SDN 100 or in local or remote wired or wireless data communication with SDN 100.

For illustration, the description of machine-readable storage medium 166 provided herein makes reference to various aspects of SDN controller 102 (e.g., processing resource 148) and other implementations of the disclosure (e.g., method 132). Although one or more aspects of SDN controller 102 (as well as certain instructions, such as instructions 154, 156, and 158) can be applied or otherwise incorporated with medium 166, it is appreciated that in some implementations, medium 166 may be stored or housed separately from such a system. For example, in some implementations, medium 166 can be in the form of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, medium 166 is a physical medium housed within a physical chassis of an SDN controller, such as certain implementations of SDN controller 102.

Medium 166 includes machine-readable instructions 168 stored thereon to cause processing resource 148 to determine, with a Software-Defined Network (SDN) controller of an SDN, a routing path between a source node and destination node in the SDN. Instructions 168 can, for example, incorporate one or more aspects of block 138 of method 132 or instructions 154 of SDN controller 102 or another suitable aspect of other implementations described herein (and vice versa).

Medium 166 includes machine-readable instructions 170 stored thereon to cause processing resource 148 to determine an MTU value based on a configuration of tunneling protocols on the source node and the destination node. Instructions 170 can, for example, incorporate one or more aspects of block 134 of method 132 or another suitable aspect of other implementations described herein (and vice versa).

Medium 166 includes machine-readable instructions 172 stored thereon to cause processing resource 148 to install the MTU value on switches along the primary routing path that are within the control domain of the SDN. Instructions 172 can, for example, incorporate one or more suitable aspects of other implementations described herein (and vice versa). In some implementations, medium 166 includes instructions to transmit failover instructions to the switches along the primary routing path to switch to the alternate routing path if the primary routing path fails.

FIGS. 7 and 8 are diagrams of an example use case for SDN 100. It is appreciated that the following use case description is provided solely as an example for illustration purposes and is not intended to be limiting to the present disclosure. In SDN 100 of FIGS. 7 and 8, the various controlled nodes are configured through SDN controller 102 (or SDN controller 102 is aware of all the configurations of the nodes). Here, SDN controller 102 maintains a list of originators and terminators of Baby Giant frames. Along with this, SDN controller 102 stores the encapsulation overhead for each of the protocols that is to be supported, and will further store the best path(s) from originator to terminator. The following table indicates the data that SDN controller 102 will maintain for the SDN of FIGS. 7 and 8:

| Originator | Terminator | Encapsulation Overhead | Path |
|---|---|---|---|
| N1 | N10 | 4 bytes | N1-N2-N6-N10 |
| N1 | N8 | 20 bytes | N1-N3-N5-N8 |

From the above table, SDN controller 102 will next pick all the nodes that are part of the best path for an entry, and verify the MTU configured on these nodes. As encapsulated frames are to be forwarded through these switches without fragmentation, the configured MTU is incremented by the encapsulation overhead. Assuming that all the nodes in SDN 100 have an MTU configured as 1500 bytes, then N1, N2, N6 and N10 will have MTU updated to 1504 bytes after the first table entry is examined. After the second entry is traversed, the MTU on N1, N3, N5 and N8 will be updated to 1520 bytes. Note that node N1 is part of both baby giant networks, hence N1 has to be assigned the highest MTU with which it can forward packets from all the networks without fragmentation. So, in this case, N1 is configured an MTU of 1520 bytes.

When a primary underlay path to a tunnel endpoint fails, the alternate path will be identified. The baby giant network identification and MTU updating procedures described above will be repeated for the new path also. Also, instead of reactively programming the MTU, alternate paths can be programmed in prior, to avoid the overhead of programming MTU on multiple devices at the time of a link failure. Thus in the above network, if the link between N3 and N5 fails, the baby giant network table maintained in the SDN controller will be updated as:

| Originator | Terminator | Encapsulation Overhead | Path |
|---|---|---|---|
| N1 | N10 | 4 bytes | N1-N2-N6-N10 |
| N1 | N8 | 20 bytes | N1-N2-N6-N10-N8 |

It is appreciated that nodes N2, N6 and N10 will be configured with a new MTU value of 1520 bytes. When the primary path comes up back again, the configurations can be reverted back from the alternate path to go back to the previous state. Also, based on load-balancing support, nodes on multiple paths can be configured with the new MTU value to support non-fragmented traffic through same tunnel. For any combination of encapsulated frames/baby giant networks this solution can be applied dynamically so that unwanted fragmentation overheads can be avoided.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

As used herein, "logic" is an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

What is claimed is:

1. A method comprising:
   determining, with a Software-Defined Network (SDN) controller of an SDN, a first Maximum Transmission Unit (MTU) value for switches along a routing path for a data flow based on packet overhead for the data flow;
   determining an alternate routing path for the data flow and a second MTU value for at least one switch along the alternate routing path;
   transmitting MTU installation instructions to the switches along the routing path and the alternate routing path to install the determined first MTU value on the switches along the routing path and the determined second MTU value on the at least one switch along the alternate routing path prior to a link failure;

transmitting failover instructions to the switches along the routing path to switch to the alternate routing path responsive to failure of a link along the routing path; and updating the second MTU value installed on the at least one switch along the alternate routing path to the first MTU value.

2. The method of claim 1, wherein the packet overhead for the data flow includes protocol overhead that is added to a base frame size.

3. The method of claim 1, wherein the packet overhead for the data flow includes encapsulation overhead that is added to a base frame size.

4. The method of claim 1, wherein the packet overhead for the data flow includes tag overhead that is added to a base frame size.

5. The method of claim 1, wherein the packet overhead for the data flow includes 4 bytes for Q-in-Q tunneling and 20 bytes for 6-in-4 tunneling to support IPv6 traffic over an IPv4 network.

6. The method of claim 1, wherein the first MTU value, the second MTU value, or a combination of the first MTU value and the second MTU is determined to avoid fragmentation of packets in the data flow.

7. The method of claim 1, wherein the first MTU value, the second MTU value, or a combination of the first MTU value and the second MTU is determined to support Ethernet frames having a size up to 1600 bytes.

8. The method of claim 1, wherein the first MTU value, the second MTU value, or a combination of the first MTU value and the second MTU is determined to support Ethernet frames having a size up to 9216 bytes.

9. The method of claim 1, further comprising:
determining a primary routing path between each source node and destination node in the SDN; and
determining an overhead value for each determined primary routing path in the SDN; and
transmitting an MTU installation instruction for switches along each determined primary routing path in the SDN.

10. The method of claim 9, further comprising:
determining an alternate routing path between each source node and destination node in the SDN;
determining an overhead value for each determined alternate routing path in the SDN; and
transmitting MTU installation instruction for switches along each determined alternate routing path to install the determined second MTU value on the switches of the routing path.

11. A non-transitory machine readable storage medium having stored thereon machine readable instructions to cause a computer processor to:
determine, with a Software-Defined Network (SDN) controller of an SDN, a primary routing path between a source node and destination node in the SDN;
determine a first Maximum Transmission Unit (MTU) value for switches along the primary routing path for a data flow based on a configuration of tunneling protocols on the source node and the destination node;
determine an alternate routing path for the data flow and a second MTU value for at least one switch along the alternate routing path;
transmit MTU installation instructions to the switches along the primary routing path and the alternate routing path to install the first MTU value on switches along the primary routing path that are within a control domain of the SDN and the second MTU value on the at least one switch along the alternate routing path prior to a link failure;
transmit failover instructions to the switches along the primary routing path to switch to the alternate routing path responsive to failure of a link along the primary routing path; and
update the second MTU value installed on the at least one switch along the alternate routing path to the first MTU value.

12. The medium of claim 11, wherein the medium is a physical medium housed within a physical SDN controller chassis.

13. A Software-Defined Networking (SDN) controller comprising:
a processing resource; and
a memory resource storing machine readable instructions to cause the processing resource to:
determine a primary routing path and an alternate routing path between a source node and destination node in an SDN;
determine a first Maximum Transmission Unit (MTU) value for switches along the primary routing path for a data flow based on frame overhead between the source node and the destination node;
determine a second MTU value for at least one switch along the alternate routing path;
transmit MTU installation instructions to the switches along the primary routing path and the alternate routing path to install the determined first MTU value on the switches along the primary routing path and the determined second MTU value on the at least one switch along the alternate routing path prior to a link failure;
transmit failover instructions to the switches along the primary routing path to switch to the alternate routing path responsive to failure of a link along the primary routing path; and
update the second MTU value installed on the at least one switch along the alternate routing path to the first MTU value.

* * * * *